United States Patent [19]

Johannessen et al.

[11] 4,059,801
[45] Nov. 22, 1977

[54] APPARATUS FOR DEGRADING Q IN A HIGH-Q RF PULSE TRANSMITTING SYSTEM AND THE LIKE

[76] Inventors: Paul R. Johannessen, 40 Tyler Road, Lexington, Mass. 02173; Peter Ver Planck, 103 Puritan Lane, Sudbury, Mass. 01776

[21] Appl. No.: 639,908

[22] Filed: Dec. 11, 1975

[51] Int. Cl.² .......................... H04B 1/04; G01S 1/24
[52] U.S. Cl. ...................................... 325/167; 343/103
[58] Field of Search ....................... 343/103, 120, 876; 325/167, 160

[56] References Cited
U.S. PATENT DOCUMENTS

| 3,118,143 | 1/1964 | Burns | 343/120 |
| 3,889,263 | 6/1975 | Johannessen | 343/103 |

*Primary Examiner*—Maynard R. Wilber
*Assistant Examiner*—Richard E. Berger
*Attorney, Agent, or Firm*—Rines and Rines, Shapiro and Shaprio

[57] ABSTRACT

A high-Q, pulse transmitting antenna system is disclosed, as of the Loran type, wherein a simple solidstate circuit, employing mainly passive elements serves, during quiescent periods between transmissions, to introduce loss into the antenna circuit, thereby selectively to lower the Q of the antenna circuit and thus prevent spurious oscillations therein during such quiescent periods.

11 Claims, 2 Drawing Figures

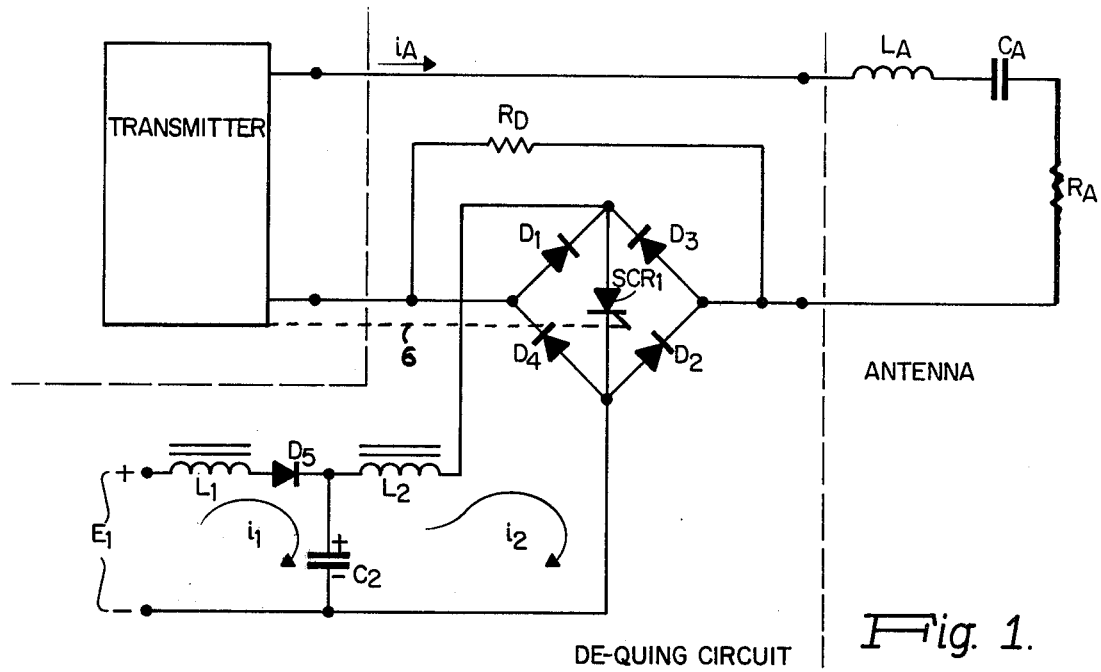
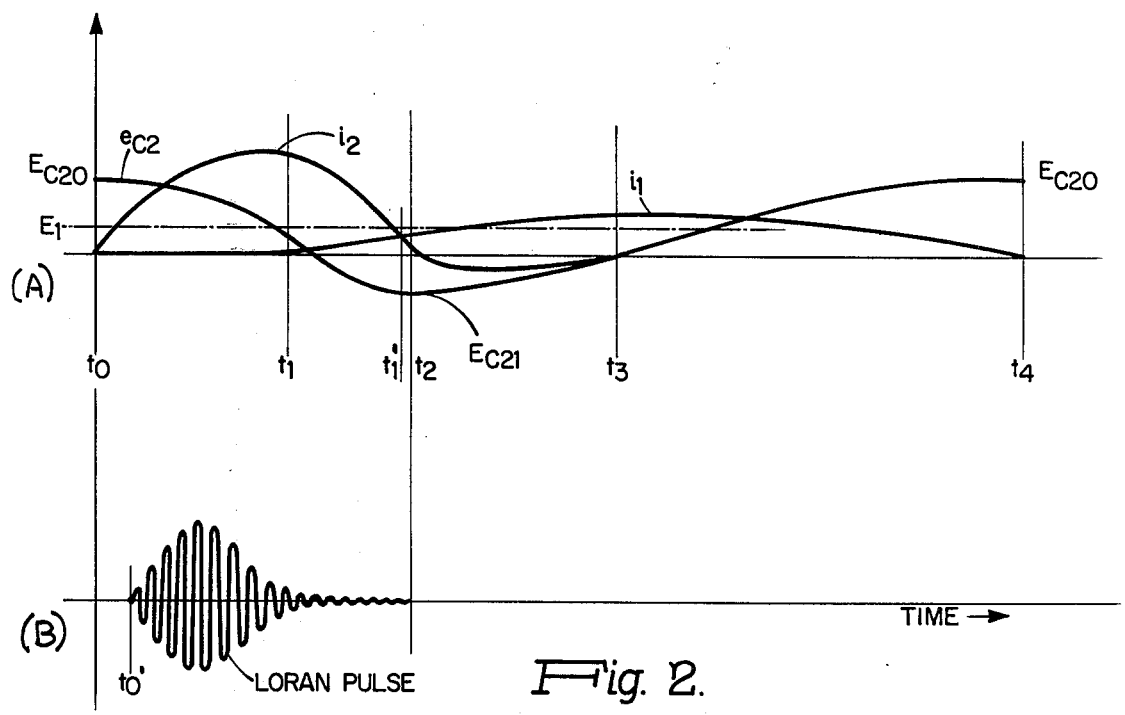

APPARATUS FOR DEGRADING Q IN A HIGH-Q RF PULSE TRANSMITTING SYSTEM AND THE LIKE

The present invention relates to apparatus for selectively degrading the Q of high-Q circuits and the like, being more particularly concerned with apparatus for lowering the Q of RF pulse transmitting circuits during quiescent periods to mitigate against the effects of atmospheric disturbances such as lightning, producing oscillations in the high-Q circuit that interfere with the timed transmitted pulse information.

RF pulse-transmission antennas, as of the Loran C or D navigation type, are usually high-Q circuits vulnerable to atmospheric disturbances, such as lightning, that, during quiescent periods, can excite in the antenna spurious random current oscillations at the Loran frequency. To reduce the resulting interference with the regular periodic Loran pulse transmissions, it has been proposed to quench and filter such spurious currents with the aid of a large number of series-connected transistors that effect resistance insertion in the antenna during quiescent periods between transmitted pulses, thereby to lower the antenna Q as described, for example, in "Loran D Solid State Transmitter," Report No. 4221-5, Sperry Gyroscope Division of Sperry Rand Corporation. Such techniques not only require a large number of, high-power active transistors, but are further unreliable in the necessity for complex control gating.

An object of the present invention, accordingly, is to provide a new and improved Q-modifying apparatus, void of the necessity for such pluralities of active devices, such as transistors, and operable with mostly passive, inherently high-current and relatively inexpensive elements for effecting lowering or degrading of the antenna circuit Q during periods between transmitted pulses.

Another object is to provide such a system in which a lossy element is introduced into and removed from the antenna circuit in a highly reliable fashion.

These and still further objects are discussed hereinafter and are more particularly pointed out in the appended claims.

In summary, from one of its view points, the invention enables a lossy element to be introduced into the antenna circuit and effectively removed therefrom in the period between successive RF transmitted pulses, with the aid of a passive bridge circuit.

The invention will now be described with reference to the accompanying drawing in which:

FIG. 1 is a schematic circuit diagram, partly in block diagram form of a preferred pulse-transmitting system of the present invention; and FIGS. 2A and 2B illustrate voltage and current waveforms generated in the system of FIG. 1.

Referring now to FIG. 1, a transmitter, so-labelled, such as a Loran C navigation periodic pulse transmitter as of the type described for example, in U.S. Letters Pat. No. 3,832,573, is shown generating and feeding successive RF pulses (current $i_A$) to a high-Q antenna circuit, so-labelled, schematically represented by the inductance-capacitance-resistance circuitry designated $L_A$, $C_A$ and $R_A$.

As above noted, transient oscillations can be set up in the high-Q antenna circuit by spurious signals generated in the quiescent period between pulses, which can be particularly troublesome in the Loran-type system. To obviate the same, a Q-modifying (lowering or degrading) circuit, labelled "De-Quing Circuit", is provided comprising a solid-state switch containing preferably a passive-element bridge of successively oppositely poled diodes $D_1$, $D_2$, $D_3$, and $D_4$, the horizontal vertices of which are connected to opposite terminals of a lossy resistive element $R_D$ and between the transmitter and antenna, and with an electronic gating switching element, shown as $SCR_1$, connected between the opposite or vertical, vertices of the bridge, as illustrated. The "De-Quing Circuit" also includes a turn-on circuit comprising a DC resonant charging and discharging power supply $E_1$ including series resonant charging and discharging inductors $L_1$ and $L_2$, a shunt capacitor $C_2$ and a check diode $D_5$. The operation of this circuit will now be explained with reference to the voltage and current waveforms of FIGS. 2A and 2B. At time $t_o$ in FIG. 2(A), just prior to the start $t_o'$ of the transmission of a Loran or similar RF pulse, FIG. 2B, a trigger or gating pulse is applied via conductors 6 to the gate electrode of $SCR_1$, causing it to conduct. The turnon of $SCR_1$ causes capacitor $C_2$, charged as shown, to discharge through the inductor $L_2$ and $SCR_1$ as a result of the connection of the right-hand terminal of $L_2$ to the upper vertex of the bridge and the connection of the lower terminal of $C_2$ to the lower bridge vertex. This discharge current is labelled $i_2$ in FIGS. 1 and 2A; and in view of the resonant circuit formed by $C_2$, $L_2$ and $SCR_1$, is designed to have a relatively high Q so that the voltage $e_{c2}$ stored in $C_2$ reverses in polarity from value $E_{c20}$, FIG. 2A, to the value $E_{c21}$ in the time period $t_o$ to $t_2$. The current $i_2$ that flows through $SCR_1$ during this time interval $t_o$ to $t_2$ turns the passive diode bridge switch $D_1$-$D_4$ "on", causing the antenna exciting pulse current from the transmitter to by-pass the lossy element $R_D$. Outside this time interval $t_2$, as later explained, the resistor or other lossy element $R_D$ is effectively connected in series between the transmitter and the antenna, causing the resulting antenna circuit Q to be low or degraded or "de-qued" and thus rendered insusceptible to resonance from spurious signals in the quiescent period between Loran pulse transmissions.

At time $t_1$ (FIG. 2A), the voltage $e_{c2}$ on capacitor $C_2$ decreases below the power supply voltage $E_1$, causing a current, shown at $i_1$ in FIGS. 1 and 2A, to flow through inductor $L_1$. By adjusting the value of $L_1$ to a greater value than $L_2$, the current $i_1$ will increase slowly as compared to current $i_2$ until the two currents are equal in magnitude, at time $t_1'$. The capacitor charging circuit is thus of greater time constant than the capacitor discharging circuit. At the slightly later time $t_2$ (after the termination of the Loran pulse, FIG. 2B), the current $i_2$ goes to zero, and a reverse voltage builds up on $SCR_1$ causing it to recover during the quiescent time interval from $t_2$ to $t_3$. It will not be until near the end of the quiescent interval between transmitted pulses $t_4$ that the voltage $e_{c2}$ of the capacitor $C_2$, charged resonantly from the supply $E_1$ through inductor $L_1$ and diode $D_5$, will become fully charged to the value $E_{c20}$ again, a value larger in magnitude than $E_1$, as shown, in view of such resonant charging. The check diode $D_5$ prevents the capacitor $C_2$ from discharging back into the power supply; and after time $t_4$, the next Loran or similar RF pulse transmission can be generated.

It will be noted that the presence of voltage on $C_2$ in the quiescent period between transmitted pulses, back-biases the diodes of the bridge $D_1$-$D_4$ so that a spurious AC voltage of peak value up to that bias value can appear in the antenna circuit $L_A$-$C_A$-$R_A$ without exciting resonance and generating an undesired impulse, in view of the rendering of the antenna circuit of low Q during such period. This operation occurs reliably and simply with minimum components and principally passive elements. While it has been described with reference to Loran pulse operations, moreover, the invention is clearly also useful in similar systems wherein the same or similar problems may arise that require modification of the Q of the circuits; and modifications will accordingly suggest themselves to those skilled in this art, being thus considered to fall within the spirit and scope of the invention as defined in the appended claims.

What is claimed is:

1. Apparatus for degrading the Q of a resonant circuit during quiescent periods and the like, having, in combination, a resonant circuit adapted to be excited by impulses to generate therein current oscillations of predetermined frequency, pulse generating means connected with the resonant circuit to excite the same into oscillation in response to a predetermined pulse, loss-producing means connected between said pulse generating means and said resonant circuit and operative, when so-connected, to lower the Q of said circuit such that resonant excitation thereof is inhibited, and switching means operable synchronously with the said pulse generating means for effectively removing said loss-producing means during the time of the generated pulse, thus to restore the Q and enable such pulse to excite the resonant circuit into said oscillations of predetermined frequency, said last-named means comprising switch-controlled rectifier bridge means connected with resonant capacitor charging and discharging circuits, the rectifier bridge means being normally back-biased by the charged capacitor to maintain the effective connection of the loss-producing means operative, and the discharging circuit, upon operation of said switching means, causing conduction of the rectifier bridge means effectively to remove said loss-producing means to permit the generated pulse to excite the resonant circuit, the time of re-charging through the resonant capacitor charging circuit being adjusted to open the switching means and back-bias the rectifier bridge, thus to restore the loss-producing means and lower the Q of the resonant circuit again.

2. Apparatus as claimed in claim 1 and in which the resonant capacitor charging circuit is of greater time constant than that of the capacitor discharging circuit.

3. Apparatus as claimed in claim 1 and in which said rectifier bridge means comprises a full-wave four rectifier bridge one pair of opposite vertices of which is connected in parallel with said loss-producing means so as effectively to remove the same when the bridge means is conductive, through by-passing the same, and the other pair of vertices of which is connected across said capacitor discharging circuit.

4. Apparatus as claimed in claim 3 and in which said switching means comprises an electronic switch connected between one of the pair of bridge means vertices.

5. Apparatus as claimed in claim 1 and in which said resonant circuit comprises a resonant antenna and said pulse generating means comprises a pulse transmitter for periodically exciting said antenna.

6. Apparatus for degrading the Q of a high-Q antenna circuit in the period between transmitted pulses that includes, in combination, means for periodically generating successive pulses, high-Q antenna circuit means connected to receive said pulses and to resonate in response thereto to produce corresponding periodic RF pulse transmissions, resistive loss-producing means, means for introducing said resistive loss-producing means into the antenna circuit only for the length of the time interval between said successive pulses and removing the same during said pulse transmissions, said introducing means comprising electronic switching means controlled by time-constant charging and discharging circuit means.

7. Apparatus as claimed in claim 6 and in which said switching means comprises rectifier bridge circuit means and said loss-producing means comprises resistance that is connected in series with the antenna circuit means in said time intervals and is bypassed by the bridge circuit means during the said pulse transmissions.

8. Apparatus as claimed in claim 7 and in which the bridge circuit means comprises a four diode bridge with an SCR switch connected between two opposing vertices of the bridge, said resistance being connected between the other two vertices of the bridge.

9. Apparatus as claimed in claim 8 and in which said generating means includes means for applying a trigger pulse to gate the SCR just prior to generating each pulse transmission.

10. Apparatus as claimed in claim 9 and in which said discharging circuit means comprises a resonant circuit including capacitance adapted to discharge through the SCR and cause conduction of said diode bridge to by-pass the said resistance during each of the said pulse transmissions.

11. Apparatus as claimed in claim 10 and in which said charging circuit means also comprises a resonant circuit including said capacitance for applying a reverse-bias voltage to said diode bridge following said pulse transmission, thus to insert said resistance into the antenna circuit and thereby degrade its Q, rendering the same insensitive to resonance in response to signal excitation in the quiescent periods between said pulse transmissions.

* * * * *